US012736398B2

(12) United States Patent
Ju et al.

(10) Patent No.: US 12,736,398 B2
(45) Date of Patent: Sep. 15, 2026

(54) INTEGRATED OPTICAL SYSTEM-BASED OPTICAL DETECTION DEVICE

(71) Applicant: OPTONICS CO., LTD., Gwangju (KR)

(72) Inventors: Seong-Min Ju, Gwangju (KR); Young-Woo Lee, Gwangju (KR)

(73) Assignee: OPTONICS CO., LTD., Gwangju (KR)

( * ) Notice: Subject to any disclaimer, the term of this patent is extended or adjusted under 35 U.S.C. 154(b) by 265 days.

(21) Appl. No.: 18/710,447

(22) PCT Filed: Nov. 16, 2022

(86) PCT No.: PCT/KR2022/018086
§ 371 (c)(1),
(2) Date: May 15, 2024

(87) PCT Pub. No.: WO2023/096257
PCT Pub. Date: Jun. 1, 2023

(65) Prior Publication Data

US 2025/0003795 A1 Jan. 2, 2025

(30) Foreign Application Priority Data

Nov. 23, 2021 (KR) ........................ 10-2021-0162102

(51) Int. Cl.
*G01J 1/04* (2006.01)

(52) U.S. Cl.
CPC ........... *G01J 1/0429* (2013.01); *G01J 1/0425* (2013.01)

(58) Field of Classification Search
None
See application file for complete search history.

(56) References Cited

U.S. PATENT DOCUMENTS 4,962,990 A * 10/1990 Matsuzawa .............. G02B 6/32 324/96
5,003,625 A * 3/1991 Khoe ...................... G02F 2/002 398/205

(Continued)

FOREIGN PATENT DOCUMENTS

JP 2005283721 A 10/2005
KR 940017015 A 7/1994

(Continued)

OTHER PUBLICATIONS

International Search Report—PCT/KR2022/018086 dated Feb. 27, 2023.

*Primary Examiner* — Chad H Smith
(74) *Attorney, Agent, or Firm* — CANTOR COLBURN LLP

(57) ABSTRACT

Provided is an optical detection device for sensing environmental changes inside and outside a fiber optic sensor probe by detecting polarization and optical power differences between a plurality of input signals, the optical detection device being characterized by comprising: a plurality of optical fiber pigtail blocks internally accommodated with a portion of the optical fibers; an integrated optical system composed of a plurality of optical components optically bonded to the optical fiber pigtail blocks at interfaces with the bulk optical components; and a balanced optical detection component for comparing components of a plurality of polarized lights received from the integrated optical system.

8 Claims, 2 Drawing Sheets

(56) References Cited

U.S. PATENT DOCUMENTS

| | | | |
|---|---|---|---|
| 6,259,831 | B1 | 7/2001 | Faris et al. |
| 2015/0345950 | A1 | 12/2015 | Yao |

FOREIGN PATENT DOCUMENTS

| | | | |
|---|---|---|---|
| KR | 20100043709 | A | 4/2010 |
| KR | 20140125001 | A | 10/2014 |
| KR | 101599043 | B1 | 3/2016 |
| KR | 20160118314 | A | 10/2016 |
| KR | 101937894 | B1 | 1/2019 |
| KR | 102188731 | B1 | 12/2020 |

* cited by examiner

INTEGRATED OPTICAL SYSTEM-BASED OPTICAL DETECTION DEVICE

TECHNICAL FIELD OF INVENTION

This invention relates to an optical detection device, and more specifically, to an integrated optical system-based optical detection device applied to an optical measurement system aimed at increasing the signal-to-noise ratio of optical sensors and optical receivers based on polarization changes.

BACKGROUND INFORMATION AND PRIOR ART

Generally, in optical sensor systems based on optical signals, balanced optical detection devices are applied. These balanced optical detection devices are crucial instruments for ensuring the reliability and accuracy of optical measurement systems. Balanced optical detection devices operate by detecting the optical power difference between two input signals to sense environmental changes inside and outside the optical fiber sensor probe. Maximizing changes in polarization and optical power difference between the two input signals, namely the reference signal and the sensing signal, helps enhance the reliability of the sensor.

In particular, conventional balanced optical detection devices effectively increase the signal-to-noise ratio of optical measurement systems by removing noise that affects the optical power of the light source, thereby improving the accuracy of measured values.

Meanwhile, typically, Polarization Diverse Balanced Photodetector devices are constructed through alignment of bulk polarizing beam splitters and beam splitters optical components. In other words, conventional bulk (Cube) optical components undergo optical alignment to ensure efficient transmission of optical signals."

Referring to FIG. 2, such optical alignment can occur during the process of mounting each optical component onto a mount (1) or after being mounted on the mount. In other words, alignment is performed to minimize power loss of optical signals by minimizing insertion loss through coupling between the optical fiber (2) and the bulk optical system (3). This alignment process aims to minimize the decrease in power of optical signals.

Meanwhile, apart from the existing mechanical optical system alignment, bulk optical components are combined using adhesives. That is, conventionally, a method of performing optical alignment between optical components and then adhesive-bonding the optical components in an optimal alignment state is applied.

However, optical alignment using these mechanical or adhesive methods has the disadvantage that it is difficult to maintain the alignment continuously, and the optical alignment may be distorted in response to external shock or vibration, or may be deformed in response to changes in temperature or humidity. Therefore, in a structure where optical components are mounted apart from each other, the optical system requires precise alignment between optical components.

Referring to FIG. 1, an alignment body 22 having semicircular grooves 23, 25, and 26 is conventionally disclosed for precise optical alignment, and a technology for aligning optical components through this alignment body has been disclosed.

However, although the alignment body 22 has the advantage of easily aligning optical components, there is the cumbersome problem of having to individually manufacture the alignment body 22 taking into account the shapes of existing optical components. In addition, since the size and shape of optical components such as optical lenses, mirrors, and optical fibers vary depending on the type of alignment body 22 used, there arises a problem of separately aligning the optical components.

(Patent Document 0001) Korean Patent Publication No. 10-1994-0017015

(Patent Document 0002) Korean Patent Publication No. 10-2010-0043709

SUMMARY OF THE INVENTION

The present invention aims to solve the above problems by providing an integrated optical system-based integrated optical detection device that minimizes changes in optical characteristics caused by external vibrations or temperature changes, eliminates the need for separate alignment processes, minimizes optical losses through optical bonding, and maximizes optical transmission efficiency.

According to one embodiment of the present invention for achieving the above objectives, there is provided an integrated optical system-based optical detection device for sensing environmental changes inside and outside a fiber optic sensor probe by detecting polarization and optical power differences between a plurality of input signals, comprising:

a plurality of pig-tailed optical fiber blocks internally accommodated with a portion of the optical fibers.

an integrated optical system composed of a plurality of optical components optically bonded to the pig-tailed optical fiber blocks at interfaces with the pig-tailed optical fiber blocks; and a balanced optical detection component for comparing components of a plurality of polarized lights received from the integrated optical system.

Preferably, the pig-tailed optical fiber blocks are made of low thermal expansion glass material, the blocks facing each other, each of the blocks provided with V-shaped or U-shaped machined grooves where the optical fibers are seated.

Preferably, the integrated optical system comprises: a 45-degree rotator that rotates the light source of input signal 1 by 45 degrees, a beam splitter that splits the incident light into input signals 1 and 2 at a 50:50 ratio, and a plurality of polarization splitters that separate the polarized lights of these signals, the beam splitter serving as division into and combination of input signals 1 and 2.

Preferably, the plurality of polarization splitters are positioned on the upper surface and side surface of the beam splitter, respectively, with boundaries thereof being optically bonded.

Preferably, there is further provided a dummy block, wherein the dummy block has side surfaces optically bonded to the boundaries of the plurality of polarization splitters, is diagonally positioned relative to the beam splitter, and is made of low thermal expansion silica material.

According to the present invention, firstly, a process of separately aligning optical blocks and optical fibers by bonding optical components as one piece is unnecessary.

Secondly, by providing an integrated optical system, the present invention can minimize minimizing optical loss that occurs in the existing boundary area since no boundary area is formed between optical components, and fundamentally prevent distortion (misalignment) caused by external shocks or vibrations, thereby enhancing the measurement reliability of the photodetection device.

Thirdly, stable light detection is achieved by minimizing the optical loss of the output light source, thereby realizing smooth transmission of the light source and sensing optical signals.

Fourthly, the invention is based on an integrated optical system made of low thermal expansion glass material, and therefore changes in optical characteristics due to temperature changes can be minimized.

DETAILED DESCRIPTION OF THE EXEMPLARY EMBODIMENTS

Figure 1:
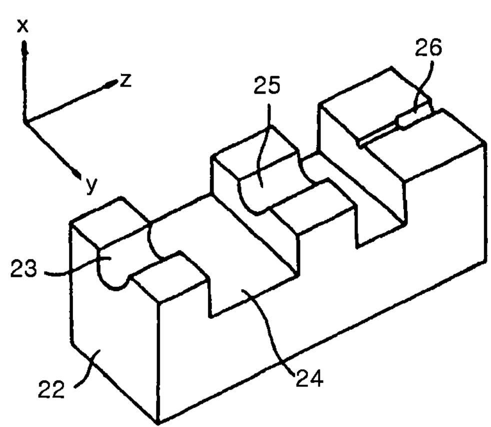
FIG. 1 is a perspective view of a conventional alignment body for optical components.
Figure 2:
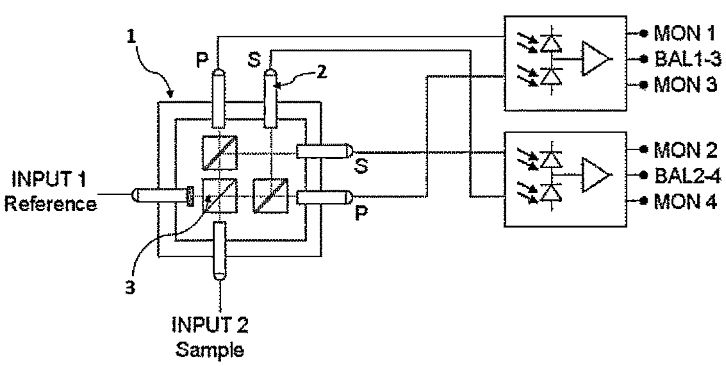
FIG. 2 is a configuration diagram of a conventional bulk-type Polarization Diverse Balanced Photodetector device based on optical components.

Below, the present invention will be described in more detail with reference to the attached drawings. The attached drawings are provided as examples to sufficiently convey the gist of the present invention to those skilled in the art. Therefore, the present invention is not limited to the drawings provided below and may be embodied in other forms. Additionally, throughout the specification, the same reference numbers represent the same components. It should be noted that identical components in the drawings are denoted by the same reference numerals wherever possible.

Figure 3:
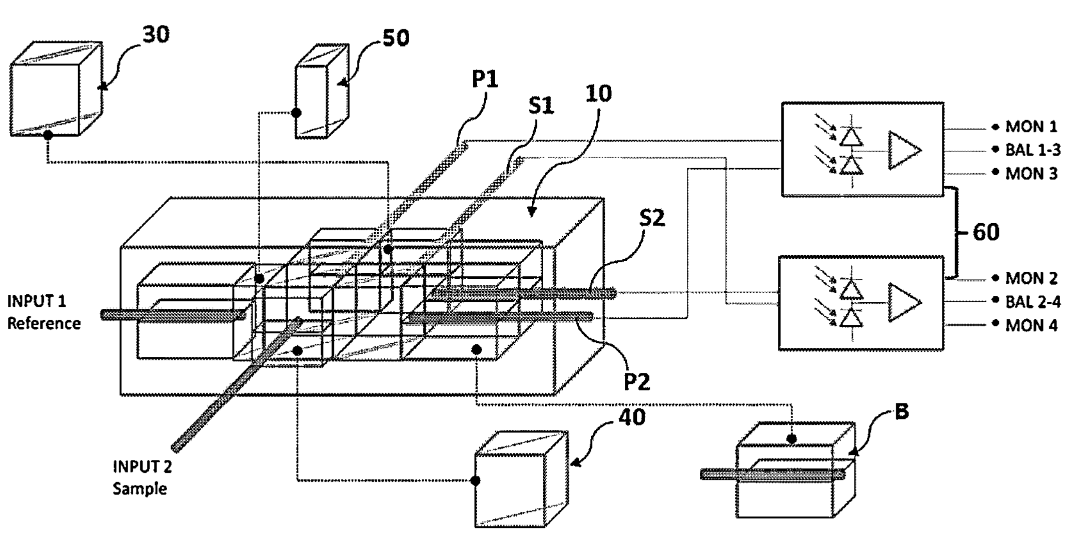
FIG. 3 is a schematic diagram of the configuration of a Polarization Diverse Balanced Photodetector device based on an integrated optical system according to an embodiment of the present invention.
Figure 4:
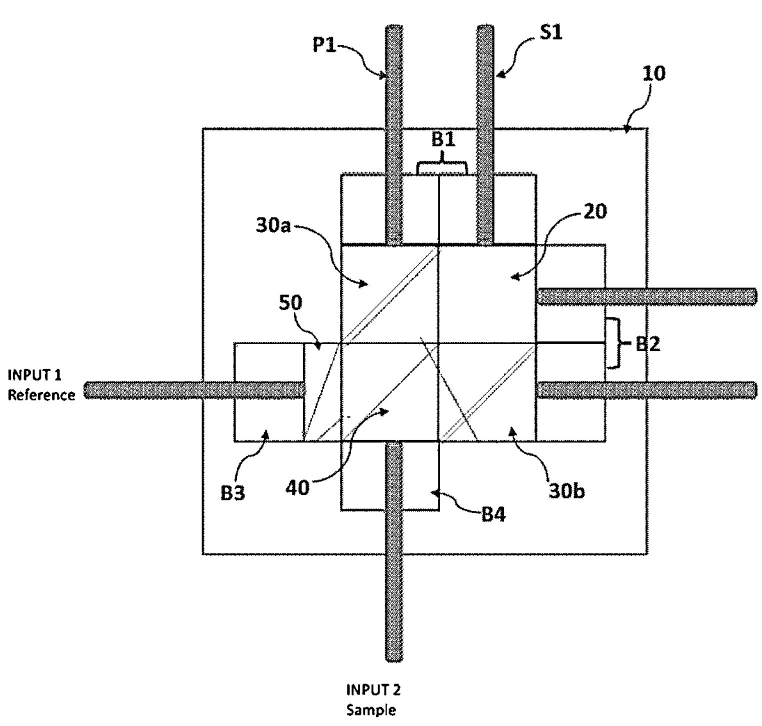
FIG. 4 is a plan view of the integrated optical system of FIG. 3.

Referring to FIGS. 3 and 4, in an integrated optical system-based optical detection device of the present invention, a plurality of pig-tailed optical fiber blocks (B) are provided in a base (10). Here, the pig-tailed optical fiber block (B) has a V-shaped or U-shaped machined groove formed between a lower block and an upper block made of low thermal expansion glass material, respectively. Further, the optical fiber is provided in a block form in a state where the optical fibers are pigtailed in the V-shaped or U-shaped machined groove and are engaged with each other. Here, the optical fiber pigtail block (B) may be replaced with an optical fiber collimator (optical input/output unit) in which a photodetector (optical detection unit) and a GRIN (gradient index lens) lens are combined, as needed. By configuring in this way, it may be helpful to minimize optical loss by reducing alignment difficulty during optical coupling.

Meanwhile, the optical fiber pigtail block (B) may be configured to accommodate terminals for input signal 1 (Reference signal 1) and input signal 2 (Sensing signal 2). Specifically, a 45-degree polarization rotator (50) is placed in front of the beam splitter (40) where input signal 1 is incident. As a result, input signal 1, as the signal of the light source itself, is rotated by the 45-degree polarization rotator (50) to become a linearly polarized reference signal rotated by 45 degrees, and then this signal is split by the beam splitter (40) in a 50:50 ratio. Alternatively input signal 1 based on the polarization-maintaining optical fiber can be directly rotated by a dummy block and a collimator to a direction rotated by 45 degrees, and the linearly polarized signal rotated by 45 degrees by the beam splitter (40) is split in a 50:50 ratio.

Input signal 2 (Sensing signal 2) is inputted as a sample signal through an optical fiber sensor probe. The optical terminal where input signal 2 is directed is coupled to the beam splitter (40), enabling input signal 2 to intersect with the light source of input signal 1.

Through the beam splitter (40) combined in this way, the optical signal of input signal 1 and the optical signal of input signal 2 intersect with each other and are transmitted to the polarization beam splitters (30*a*, 30*b*; 30), respectively, in a 50:50 ratio. Here, the polarization beam splitters (30*a*, 30*b*) are disposed on the top and the side of the beam splitter (40). For stable coupling of the polarization beam splitters (30*a*, 30*b*), a dummy block (20) made of low thermal expansion silica material is disposed to form an integrated optical system.

The optical system constructed in this way further splitters the optical signals of input signal 1 and input signal 2 into P-polarized light (P1) and S-polarized light (S1), and P-polarized light (P2) and S-polarized light (S2), respectively, through the polarization beam splitters (30*a* and 30*b*), and these polarized lights are then branched into four channels through optically bonded optical fiber pigtail blocks (where B1 and B2, B3 and B4 function as input terminals for the input signal and sensing signals, respectively).

In this way, the invention provides an integral optical system comprising six components, that is, pig-tailed optical fiber blocks (B1~B4), a 45-degree polarization rotator (50), a beam splitter (40), two polarization beam splitters (30*a*, 30*b*), and a dummy block (20), each provided as the integral optical system through optical bonding.

Next, the components of P-polarized lights (P1, P2) and S-polarized lights (S1, S2) branched into four channels are received by a balanced optical photodetector (60) for comparison between the respective polarized light components, and optical signals are detected through an operational process.

Meanwhile, for optical bonding in the present invention, one side of each optical component constituting the integral optical system is made to have nearly the same surface shape, and the surface roughness and surface quality performance are enhanced through polishing, and foreign substances are removed through cleaning.

This optical bonding is a bond by intermolecular attraction (Van der Waal'Force) and has the effect of disappearing the bonding boundary area, and therefore has the characteristic of allowing optical signals passing through the optical component to be stably transmitted without damage or loss in the boundary area.

In other words, optical bonding is achieved by finishing the surfaces of the objects to be bonded to each other with nearly the same curvature, cleaning the surfaces, and then pressing them together as they are or by with the addition of water or benzene. This optical bonding results in an increase in bonding force in the surface state over time after boning. The gap between the bonded surfaces is less than 4 micrometers, so there is almost no angle error due to bonding, and there is no distortion after bonding.

Furthermore, in the present invention, low thermal expansion glass materials are employed and the refractive indexes of optical components are made uniform. This enables stable transmission and detection of optical signals between optical components without loss.

Specifically, the present invention provides an integrated optical system made of low thermal expansion glass material in constructing Polarization Diverse Balanced Photodetector device. This minimizes changes in optical characteristics due to external vibrations and temperature fluctuations. In addition, the optical blocks and fiber optics can be easily configured without separate alignment by optically bonding polarization beam splitters (30*a*, 30*b*), a 45-degree polarization rotator (50), a beam splitter (40), and optical fiber pigtail blocks (B1~B4).

In particular, the integration of these optical blocks involves machining each optical block to have a right angle, and then bonging the optical blocks to each other optically without the need for separate adhesives between the machined surfaces. This optical bonding method creates an effect where the boundary surfaces disappear, minimizing optical losses that occur at the boundary surfaces.

Furthermore, the present invention can minimize optical losses of the light source output through smooth transmission of the light source and sensing optical signals. Additionally, by directly bonding the coupling between optical fibers and bulk optical components, integration eliminates the need for separate alignment processes, maximizing optical transmission efficiency.

In addition, conventional mechanical method or adhesive bonding of bulk optical components typically utilized a method of optically aligning the optical components and then mechanically fixing or bonding them in an optimal alignment state. However, in the present invention, mutual bonding is achieved through optical bonding without the need for separate adhesives between the machined surfaces. This approach minimizes optical losses and noise amplification caused by external impacts or vibrations leading to distortion (misalignment), as well as by temperature and humidity variations.

In the foregoing, specific embodiments of the present invention have been described and illustrated. However, it should be understood that the present invention is not limited to the disclosed embodiments. Those skilled in the art to which the present invention pertains will recognize that various modifications can be made within the scope of the technical concept of the present invention as set forth in the following claims, without departing from the essence of the present invention.

The invention claimed is:

1. An integrated optical system-based optical detection device for sensing environmental changes inside and outside of a fiber optic sensor probe by detecting polarization and optical power differences between a plurality of input signals, comprising:

- a plurality of optical fiber pigtail blocks internally accommodated with a portion of optical fibers;
- an integrated optical system composed of a plurality of optical components optically bonded to the pig-tailed optical fiber blocks at interfaces with the pig-tailed optical fiber blocks; and
- a balanced optical detection component for comparing components of a plurality of polarized lights received from the integrated optical system,
- wherein the pig-tailed optical fiber blocks are made of low thermal expansion glass material, the blocks facing each other, each of the blocks provided with V-shaped or U-shaped machined grooves where the optical fibers are seated.

2. The integrated optical system-based optical detection device in accordance with claim 1, wherein the integrated optical system comprises: a 45-degree rotator that rotates the light source of input signal 1 by 45 degrees, a beam splitter that divides input signals 1 and 2 into a 50:50 ratio, and a plurality of polarization splitters that separate the polarized lights of these signals, wherein the beam splitter serving as division into and intersection with in put signals 1 and 2 are divided by and intersected with each other through the beam splitter.

3. The integrated optical system-based optical detection device in accordance with claim 2, wherein the plurality of polarization splitters are positioned on the upper surface and side surface of the beam splitter, respectively, with boundaries thereof being optically bonded.

4. The integrated optical system-based optical detection device in accordance with claim 3, further comprising a dummy block, wherein the dummy block has side surfaces optically bonded to the boundaries of the plurality of polarization splitters, is diagonally positioned relative to the beam splitter, and is made of low thermal expansion silica material.

5. The integrated optical system-based optical detection device in accordance with claim 1, wherein the integrated optical system comprises: a 45-degree rotator that rotates the light source of input signal 1 by 45 degrees, a beam splitter that divides input signals 1 and 2 into a 50:50 ratio, and a plurality of polarization splitters that separate the polarized lights of these signals, wherein the beam splitter serving as division into and intersection with input signals 1 and 2 are divided by and intersected with each other through the beam splitter.

6. The integrated optical system-based optical detection device in accordance with claim 5, wherein the plurality of polarization splitters are positioned on the upper surface and side surface of the beam splitter, respectively, with boundaries thereof being optically bonded.

7. The integrated optical system-based optical detection device in accordance with claim 6, further comprising a dummy block, wherein the dummy block has side surfaces optically bonded to the boundaries of the plurality of polarization splitters, is diagonally positioned relative to the beam splitter, and is made of low thermal expansion silica material.

8. An integrated optical system-based optical detection device for sensing environmental changes inside and outside of a fiber optic sensor probe by detecting polarization and optical power differences between a plurality of input signals, comprising:

- a plurality of optical fiber pigtail blocks internally accommodated with a portion of optical fibers;
- an integrated optical system composed of a plurality of optical components optically bonded to the pig-tailed optical fiber blocks at interfaces with the pig-tailed optical fiber blocks; and
- a balanced optical detection component for comparing components of a plurality of polarized lights received from the integrated optical system,
- wherein the integrated optical system comprises: a 45-degree rotator that rotates the light source of input signal 1 by 45 degrees, a beam splitter that divides input signals 1 and 2 into a 50:50 ratio, and a plurality of polarization splitters that separate the polarized lights of these signals, wherein the beam splitter serving as division into and intersection with input signals 1 and 2 are divided by and intersected with each other through the beam splitter.

* * * * *